US011262002B2

(12) United States Patent
Louden

(10) Patent No.: US 11,262,002 B2
(45) Date of Patent: Mar. 1, 2022

(54) PORTABLE UPRIGHT STAND

(71) Applicant: Kelly Louden, Bend, OR (US)

(72) Inventor: Kelly Louden, Bend, OR (US)

(73) Assignee: Kelly Louden, Bend, OR (US)

( * ) Notice: Subject to any disclaimer, the term of this patent is extended or adjusted under 35 U.S.C. 154(b) by 0 days.

(21) Appl. No.: 16/892,877

(22) Filed: Jun. 4, 2020

(65) Prior Publication Data

US 2020/0332923 A1 Oct. 22, 2020

Related U.S. Application Data

(63) Continuation of application No. 16/039,173, filed on Jul. 18, 2018, now Pat. No. 10,677,378, which is a continuation of application No. 14/715,439, filed on May 18, 2015, now Pat. No. 10,054,248.

(60) Provisional application No. 61/994,635, filed on May 16, 2014.

(51) Int. Cl.
*F16L 3/26* (2006.01)
*F16M 11/24* (2006.01)
*B65D 25/00* (2006.01)
*F21S 8/08* (2006.01)
*F21V 21/10* (2006.01)
*F21S 4/10* (2016.01)
*E04H 12/22* (2006.01)
*F21V 21/06* (2006.01)
*F21V 23/02* (2006.01)

(52) U.S. Cl.
CPC ............... *F16L 3/26* (2013.01); *B65D 25/00* (2013.01); *E04H 12/2246* (2013.01); *F16M 11/24* (2013.01); *F21S 4/10* (2016.01); *F21S 8/085* (2013.01); *F21V 21/06* (2013.01); *F21V 21/10* (2013.01); *F21V 23/02* (2013.01); *Y10T 29/49002* (2015.01); *Y10T 29/49119* (2015.01)

(58) Field of Classification Search
CPC ......... E04H 12/2246; A45B 2200/1018; E01F 9/692
See application file for complete search history.

(56) References Cited

U.S. PATENT DOCUMENTS 5,020,764 A * 6/1991 Yamamoto .......... E04H 12/2246
248/529
2010/0205875 A1* 8/2010 Rawson-Harris ... G09F 15/0037
52/126.7

* cited by examiner

*Primary Examiner* — Andrew J Coughlin
(74) *Attorney, Agent, or Firm* — Kilpatrick Townsend & Stockton LLP

(57) ABSTRACT

Embodiments include apparatuses for providing a portable upright stand. A portable upright stand can include a pole for suspending objects such as string lighting, protective coverings, etc. The pole can be coupled to a base such that electrical wiring may extend through the pole and the base. The portable upright stand can also include a reservoir that can enclose at least a portion of the pole such that the pole can be stabilized by the reservoir. The reservoir can have a first opening for filling the reservoir with water and a second opening for draining water. The portable upright stand can also have a shell that can be configured to surround the reservoir as décor or as a protective covering.

10 Claims, 11 Drawing Sheets

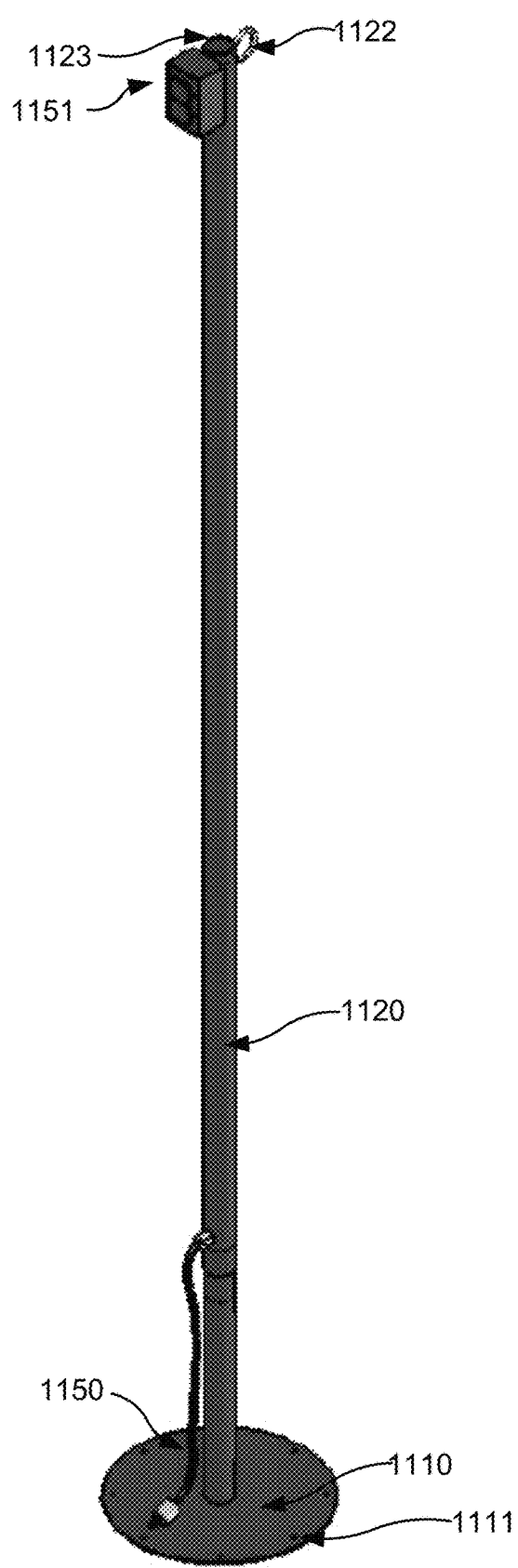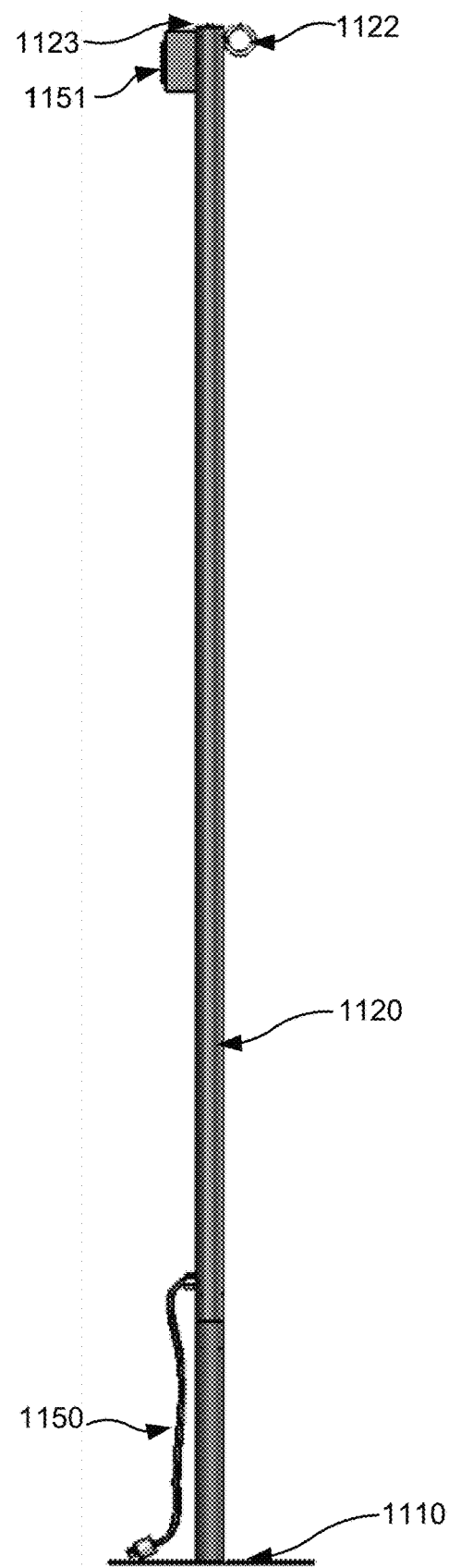
FIG. 11A
FIG. 11B

PORTABLE UPRIGHT STAND

CROSS-REFERENCES TO RELATED APPLICATIONS

This application is a continuation of U.S. application Ser. No. 16/039,173, filed Jul. 18, 2018, entitled "Portable Upright Stand", which is a continuation of U.S. application Ser. No. 14/715,439, filed May 18, 2015, now U.S. Pat. No. 10,054,248, issued Aug. 21, 2018 and entitled "Portable Upright Stand", which claims priority to and the benefit of U.S. Provisional Application No. 61/994,635, filed May 16, 2014 and entitled "Portable Upright Stand" the entire disclosure of which are herein incorporated by reference in their entirety for all purposes.

BACKGROUND

Embodiments of the present invention relate generally to portable upright stands for supporting string lighting or other displays. Creating temporary string lighting or other displays is difficult, especially in areas lacking suitable permanent structures for suspending lights and other decorations, and on varied terrain and surfaces, because of the challenge in transporting and erecting stable pole structures for support. It is also challenging to accommodate, add, and/or remove electrical power to such pole structures.

BRIEF SUMMARY

Various embodiments provide a portable upright stand that permits a user to support string lighting or other displays on any surface, indoors or outdoors, in the absence of, or in conjunction with, permanent structures. In some embodiments, the upright stand can include a base, a pole, one or more reservoirs, and a decorative shell. The base can be made of a light weight, durable and moldable material. The base can be coupled to the pole (or a sleeve of the pole where the pole can be collapsible into the sleeve). In some embodiments, the base can be designed for electrical wiring to come out of the bottom of the pole, extend through the base, and connect to an external power source. In some embodiments, the pole can serve to suspend a series of string lights and support insulated electrical wiring that can be connected to an external power source. Power can be provided to the series of string lights via the insulated electrical wiring. In certain embodiments, the one or more reservoirs can be filled with water to stabilize the portable upright stand. The decorative shell such as a wine barrel in some embodiments can be designed to surround the reservoir and provide an improved aesthetic.

Some embodiments provide a portable upright stand for supporting string lighting, the portable lighting stand including a base, a pole coupled to the base, and multiple reservoir containers. In some embodiments, the reservoir containers at least partially enclose a portion of the pole such that the pole is rotatably held by the reservoir containers. In some embodiments, each reservoir container has an opening for filling the reservoir container with ballast.

In some embodiments, the pole has a length of 7-12 feet. In some embodiments, the pole can be made of powder coated aluminum. In some embodiments, the pole is collapsible into a plurality of pole sections. In some embodiments, the reservoir containers include a shell configured to at least partially surround the reservoir containers. In some embodiments, the shell can be made of weather-resistant material. In some embodiments, each reservoir container includes hand grips. In some embodiments, each reservoir container has a second opening for draining ballast. In some embodiments, the pole can receive insulated electrical wiring extending through at least a portion of the pole. In some embodiments, the electrical wiring is coupled to another portable upright stand. In some embodiments, the base includes a sleeve for receiving the pole and a flange at the opposite end with holes. In some embodiments, the ballast comprises sand or water. In some embodiments, the portable upright stand is coupled to another portable upright stand through string lighting. In some embodiments, the reservoir containers are configurable to stacked in an interlocking manner.

Some embodiments provide a method of manufacturing a portable upright stand, including providing a base, providing a sleeve configurable to be coupled to the base, and providing one or more pole segments configurable to be coupled to the sleeve to form a pole. In some embodiments, the method further includes providing a plurality of reservoir containers capable of receiving water through an opening wherein the reservoir is configurable to at least partially enclose the sleeve. In some embodiments, the method further includes providing a shell configurable to at least partially surround the reservoir container. In some embodiments, the method further includes providing string lighting or other decorations to be coupled to the pole and supported by the portable upright stand. In some embodiments, the method further includes providing electrical wiring extendable from the top portion of the pole to another portable upright stand. In some embodiments, the method further includes coupling the electrical wiring to a power source.

BRIEF DESCRIPTION OF THE DRAWINGS

FIG. 11A illustrates a perspective view of another upright stand pole 1120 and base 1110 assembly with electrical wiring 1150 according to some embodiments of the present invention.

FIG. 11B illustrates a side view of an upright stand pole 1120 and base 1110 assembly with electrical wiring 1150 according to some embodiments of the present invention.

DETAILED DESCRIPTION

Various embodiments provide a portable upright stand that permits a user to support string lighting or other displays on any surface, indoors or outdoors, in the absence of, or in conjunction with, permanent structures. In some embodiments, the upright stand can include a base, a pole, one or more reservoirs, and a decorative shell. The base can be made of a light weight, durable and moldable material. The base can be coupled to the pole (or a sleeve of the pole where the pole can be collapsible into the sleeve). In some embodiments, the base can be designed for electrical wiring to come out of the bottom of the pole, extend through the base, and connect to an external power source. In some embodiments, the pole can serve to suspend a series of string lights and support insulated electrical wiring that can be connected to an external power source. Power can be provided to the series of string lights via the insulated electrical wiring. In certain embodiments, the one or more reservoirs can be filled with water to stabilize the portable upright stand. The decorative shell such as a wine barrel in some embodiments can be designed to surround the reservoir and provide an improved aesthetic.

Some embodiments provide multiple reservoirs to be stacked against each other. Having multiple smaller-sized reservoirs as opposed to one large heavy reservoir allows a user to transport or move a filled reservoir or container more easily. The user may also stack as many reservoirs as needed for a particular occasion by having multiple reservoirs instead of a single large reservoir. If the user desires to have more weight to stabilize the portable upright stand or more height to the stand, the user may stack additional reservoirs on top of each other. While some embodiments enable the user to stack the reservoir tanks on top of one another, some embodiments enable the user to stack the reservoir tanks sideways to gain more surface area with the bottom surface (e.g., ground) or for a different aesthetic.

Various embodiments will now be described in greater detail with reference to the accompanying figures, beginning with FIG. 1.

Figure 1:
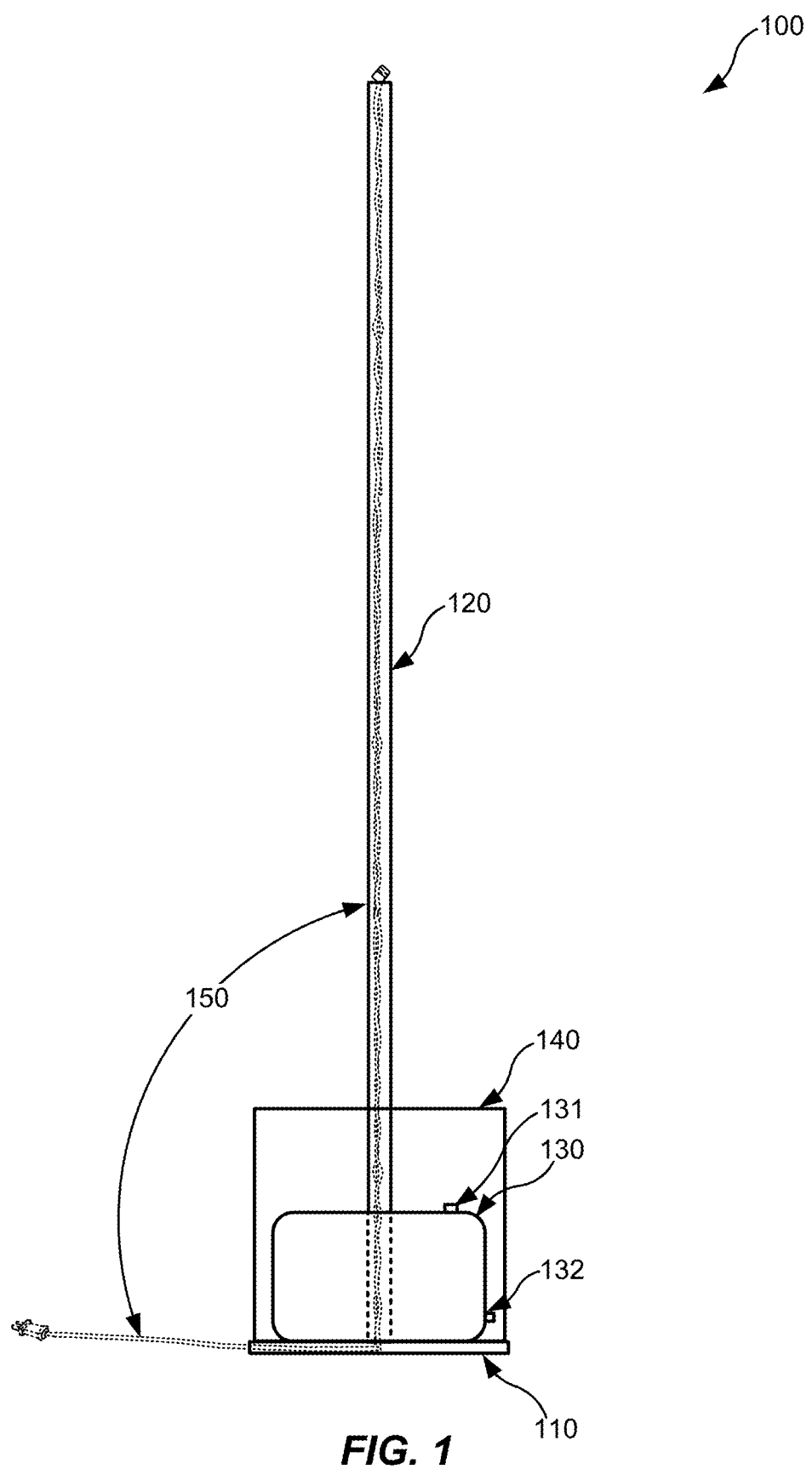
FIG. 1 illustrates a cross-sectional view of an example upright stand according to some embodiments of the present invention.

FIG. 1 illustrates a cross-sectional view of an upright stand 100 according to some embodiments of the present invention. In some embodiments, the portable upright stand 100 can include a base 110, a pole 120, a reservoir 130, and a decorative shell 140. The base 110 can be made of a light weight, durable and moldable material. In some embodiments, the base can be designed for electrical wiring 150 to come out of the bottom of the pole 120 and extend through the base 110 and connect to an external power source (not shown). The pole 120 can serve to suspend a series of string lights and to support insulated electrical wiring 150 for powering the series of string lights.

In some embodiments, the pole 120 can house electrical wiring 150. In some embodiments, the electrical wiring 150 can be secured to the exterior of the pole 120. The reservoir 130 can be filled with water (or other type of ballast such as rocks or sand) to stabilize the portable upright stand 100 and maintain the pole 120 in an upright orientation. The decorative shell 140 can be weather-resistant and designed to surround the reservoir 130 and can provide an improved aesthetic. In certain embodiments, the pole is stabilized with an anchor (e.g., tent stake, rebar stake, metal stake, helical pier, sand anchor, guide wires). In some embodiments, the portable upright stand can be used to display privacy screens, shade screens, umbrellas, flags, or other outdoor displays.

Figure 2:
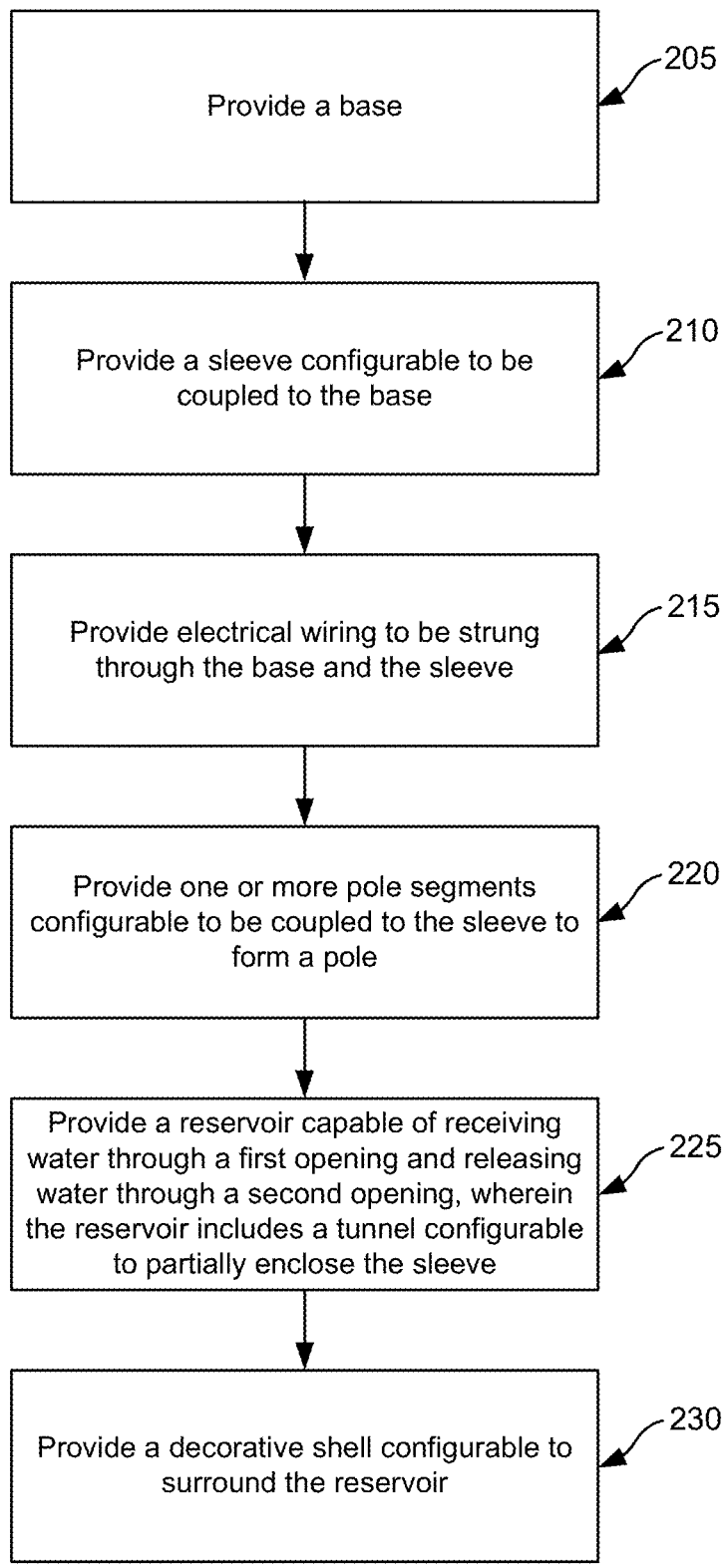
FIG. 2 illustrates an exemplary process of assembling a portable upright stand according to some embodiments of the present invention.

FIG. 2 illustrates an exemplary process 200 of assembling an upright stand according to some embodiments of the present invention. As described in FIG. 1, an upright stand can include a base 110, a pole 120, a reservoir 130, and a decorative shell 140. Not every block described in process 200 must be performed to produce an upright stand in some embodiments while other embodiments may require additional steps. As described, the assembled portable upright stand can be coupled to a series of string lights in a string lighting system. The portable upright stand can be assembled using various techniques and a combination of materials in order to provide the desired durable, weather-resistant support for the series of string lights and to fit the aesthetic of the outdoor space to be illuminated.

At block 205, process 200 can provide a base. As described, the base can be made of a light weight but durable material. In some embodiments, the shape can be one of a circular, rectangular, or other shape that can provide stability for a portable upright stand when one face of the base is placed against the ground. In certain embodiments, the base serves as a mold onto which one or more reservoirs may be placed and possibly locked.

At block 210, process 200 can provide a sleeve configurable to be coupled to the base. At block 215, process 200 can provide electrical wiring to be strung through the base and the sleeve. At block 220, process 200 can provide one or more pole segments configurable to be coupled to the sleeve to form a pole. At block 225, process 200 can provide a reservoir capable of receiving water through a first opening an releasing water through a second opening, where the reservoir includes a tunnel configurable to partially enclose the sleeve. In certain embodiments, the pole (e.g., 120 from FIG. 1) is preassembled in the reservoir (e.g., 130 from FIG. 1) to form a single unit. In some embodiments, the pole is removable and slides in and out of the reservoir. In some embodiments, the reservoir is removable from the portable upright stand assembly. A U-shaped reservoir can be used to slip around the pole in some embodiments.

In some embodiments, the pole is interlocked to the base (e.g., 1110 from FIG. 11A) via a ring or a cap such as a ferrule (e.g., 924 from FIG. 9) or via a swaged end. In some embodiments, the pole can be mounted or interlocked onto the base via one or more locking buttons that are on the pole. In some embodiments, the pole is interlocked to the base without locking buttons. In some embodiments, the base has a sleeve with a permanently affixed flange at one end wherein the pole can be screwed into the other end of the sleeve or connected via interlocking ferrules, swaged ends, with or without locking buttons. In some embodiments, the base has a sleeve with a permanently affixed flange at one end and thumb screws at the other end wherein the pole can be coupled to the sleeve and stabilized or affixed by tightening the thumb screws.

In some embodiments, the base has a sleeve with a permanently affixed flange at one end wherein a plurality of reservoirs are placed on the base on top of the flange and at least partially surrounding the sleeve to support the pole. In some embodiments, the base can be coupled to the ground without a reservoir for support. In some embodiments, the base has holes and can be affixed to concrete, asphalt, or wood surfaces the ground (e.g., via a screw or other stabilizing components) without a reservoir for support using the holes. In some embodiments, the base has a sleeve with a permanently affixed flange with holes at one end wherein the base can be anchored to ground with stakes pounded through the flange holes into the ground. In certain embodiments, the pole is stabilized with an anchor (e.g., tent stake, rebar stake, metal stake, helical pier, sand anchor, guide wires) for additional reinforcement on varying surfaces. In some embodiments, a plurality of reservoirs with a circular shape from the top perspective and with a cylindrical tube (e.g., 133 from FIG. 1) may be stacked onto the base with sleeve from the top before the pole is coupled to the base.

At block 230, process 200 can provide a decorative shell configurable to surround the reservoir. In some embodiments, the portable upright stand is designed so that approximately two inches of electrical wiring extends from the top of the pole 120 and approximately ten feet of grounded cord and plug extends from the bottom of the base.

Figure 3A:
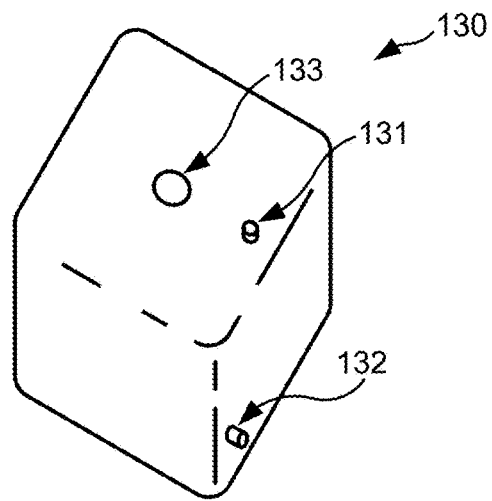
FIG. 3A illustrates a perspective view of an example reservoir according to certain embodiments of the invention.

FIG. 3A illustrates a perspective view of the reservoir according to certain embodiments of the invention. In some embodiments, the reservoir has a first opening (e.g., 131 from FIG. 1) on or near the top of the reservoir for filling the reservoir with water in order to add stability to the portable upright stand. The reservoir in certain embodiments can also have a second opening (e.g., 132 from FIG. 1) on or near the bottom of the reservoir for draining the water in order to increase the portability of the portable upright stand. In some embodiments, the first opening and/or the second opening can be sealed with a plug, screw-top, or other means to prevent unwanted flow into or out of the reservoir.

In some embodiments, the reservoir can have a closed annular body with a cylindrical tube through which the pole can be inserted and rotatably supported in an upright position substantially perpendicular to the base. In certain embodiments, the reservoir (also referred to as a tank or insert) can be made of a clear, durable, impermeable material. In some embodiments, the reservoir can hold ballast material other than water (e.g. sand, gravel, etc.). In certain embodiments, the reservoir has a capacity of approximately 15 gallons of water. In one embodiment, the reservoir has a size of 18 inches in width×18 inches in length×11 inches in height. In some embodiments, the reservoir has a circular shape from the top perspective with a cylindrical tube opening which the pole (not shown here) can be inserted. When inserted, the pole may thereby be supported in an upright position substantially perpendicular to the base.

Figure 3B:
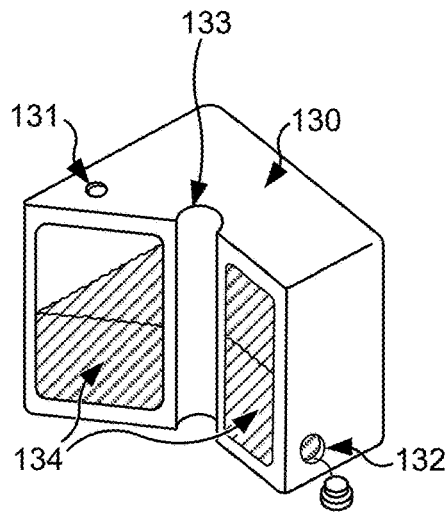
FIG. 3B illustrates a cross-sectional view of the example reservoir according to certain embodiments of the invention.

FIG. 3B illustrates a second, cross-sectional view of the reservoir 130 according to certain embodiments of the invention showing the ballast material 134 inside the reservoir 130. In some embodiments, the reservoir has top and bottom surfaces which are substantially parallel to the base and four sides with rounded edges and corners. In certain embodiments, the reservoir has a cylindrical body with top and bottom surfaces which are substantially parallel to the base.

Figure 4:
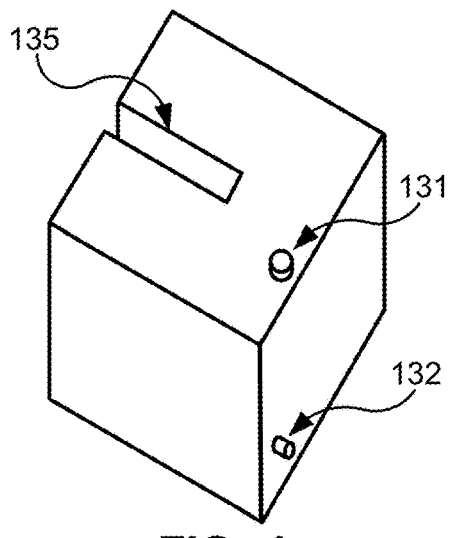
FIG. 4 illustrates a perspective view of another example reservoir according to certain embodiments of the invention.

FIG. 4 illustrates a perspective view of the reservoir according to certain embodiments of the invention. In some embodiments, the reservoir 130 has a U-shaped body with a center opening 135 in which the pole 120 (not shown here) can be inserted and rotatably supported in an upright position substantially perpendicular to the base 110. In one embodiment, the reservoir 130 has a size of approximately 18 inches in width×18 inches in length×13 inches in height. In certain embodiments, the reservoir 130 has faces that are square or rectangular. In some embodiments, the reservoir 130 has rounded edges and/or corners. In some embodiments, the reservoir is collar shaped with round corners or square corners.

Figure 5:
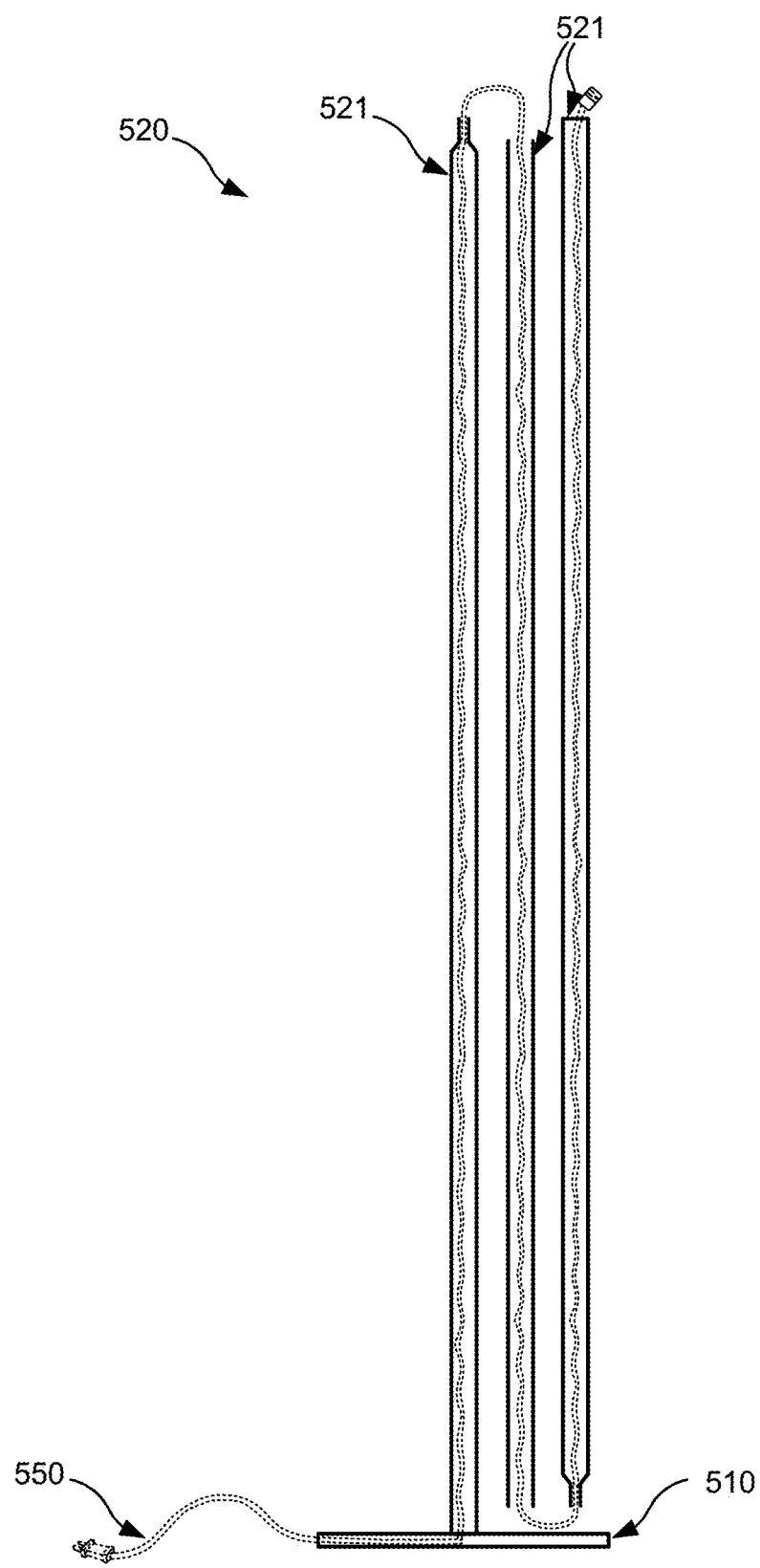
FIG. 5 illustrates a cross-sectional view of an upright stand pole that is collapsible into multiple pole sections in accordance with some embodiments of the invention.

FIG. 5 illustrates a cross-sectional view of an upright stand pole 520 collapsed into multiple pole sections 521 in accordance with some embodiments of the invention. In some embodiments, the pole 520 may be a single non-collapsible pole. In some embodiments, the pole 520 can be collapsed into two or three sections. By having a pole that is collapsible into multiple sections enables convenient and efficient packaging and shipping. A pole of extended length to be assembled by a receiving user can be easily packaged when the pole may be broken down into a number of segments. Upon receiving the collapsed pole, the receiving user may then easily assemble the segments into a single pole. In some instances, the segments may be coupled tightly by connecting the edges of each segment to each other.

In some embodiments, the pole 520 is screwed into the base plate. In some embodiments, the pole 520 is two sections and attached to the base via a sleeve. In some embodiments, the pole 520 is finished to prevent corrosion. In some embodiments, the pole 520 is made of corrosion proof materials. In some embodiments, the pole 520 is ten feet in length. In other embodiments, the pole 520 is seven feet or twelve feet in length. In some embodiments, the pole 520 is three interlocking sections. In some embodiments, a pole section 521 is affixed to the base and configured to receive and support a single, longer pole section 521 of lesser diameter. In some embodiments, tapered ends are slidably mounted into wider ends for secure connection. In certain embodiments, the user of the portable upright stand can be a consumer who receives a manufactured lighting stand, pre-assembled, boxed and shipped with the pole sections 521 collapsed and with (or without) electrical wiring 550 running through the pole sections 521. In some embodiments, the pole sections 521 are constructed from powder coated aluminum. In some embodiments the base 510 is a circular base plate. In some embodiments the base 510 is a circular base plate with welded tubing and screws for supporting poles 520 of varying size. In some embodiments, the pole 520 has a single section with electrical wiring 550 running through the pole. In some embodiments, the pole 520 has a single section with an extension cord running through the pole 520. In some embodiments, the pole 520 does not support an electrical wiring 550.

Figure 6:
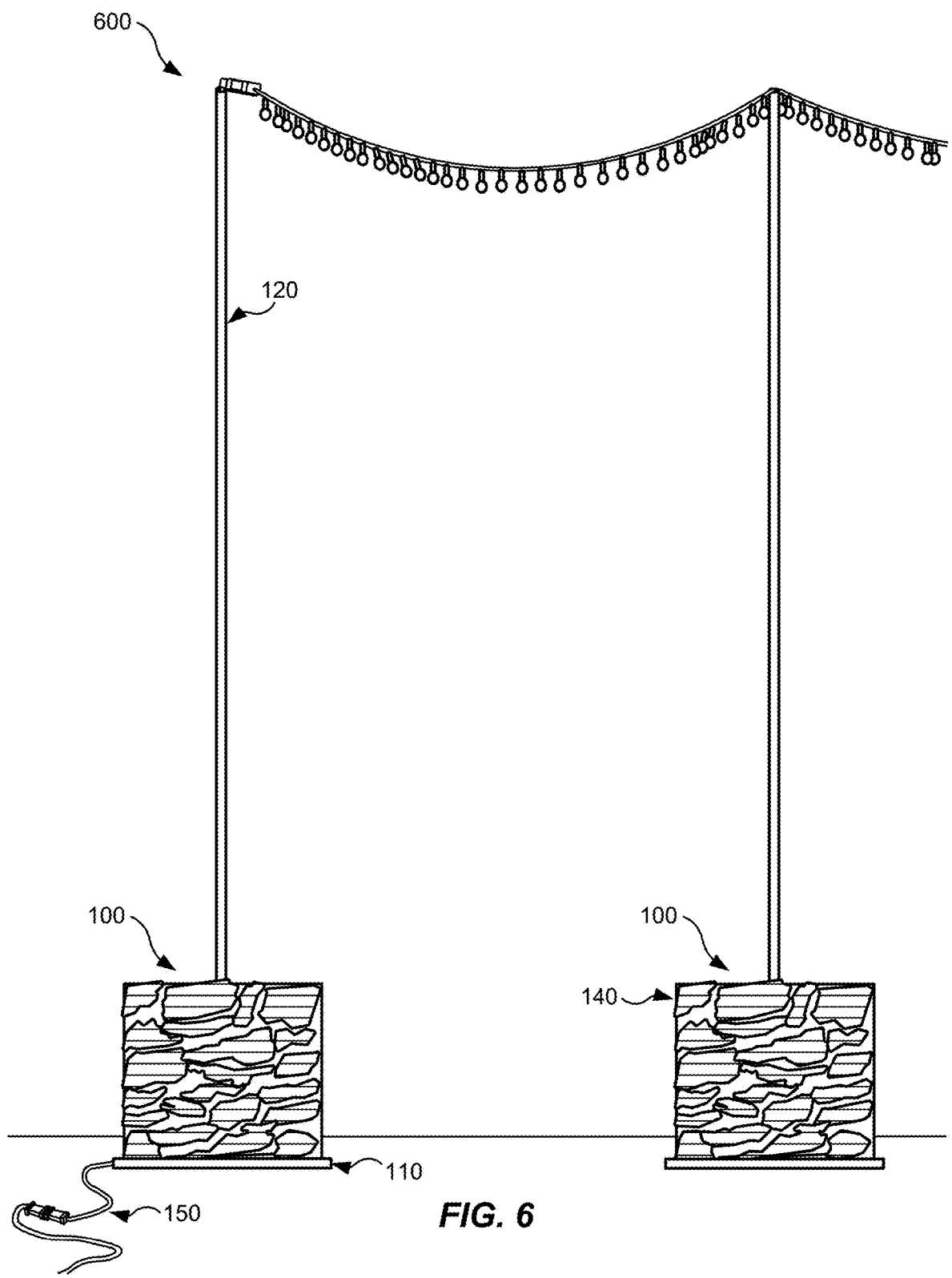
FIG. 6 illustrates a view of an example outdoor lighting system in accordance with some embodiments.

FIG. 6 illustrates a view of an example outdoor lighting system 601 including string lighting and exemplary portable upright stands 600 in accordance with some embodiments. Portable upright stand 600 can be part of a outdoor lighting system 601 in which a series of string lights is strung together, suspended, and connected to an electrical outlet. In one example, portable upright stand 100 can be incorporated into a system with a second portable upright stand 100 in an outdoor space where the first portable upright stand 100 suspends a series of string lights from its pole 120 and the second portable upright stand 100 both suspends a series of string lights from its pole 120 and also connects the series of string lights to a power source through its insulated electrical wiring 150. In some embodiments, the decorative shell 140 has a size of approximately 21 inches×21 inches×30 inches. In certain embodiments, the decorative shell 140 is constructed of resin and includes openings for hands to grip and move the upright stand 100. In some embodiments, the decorative shell 140 can have a stone-like design, wood design, or a basket weave pattern. In some embodiments, the reservoir 130 can have a decorative exterior. In some embodiments, a decorative shell 140 is not needed.

Figure 7:
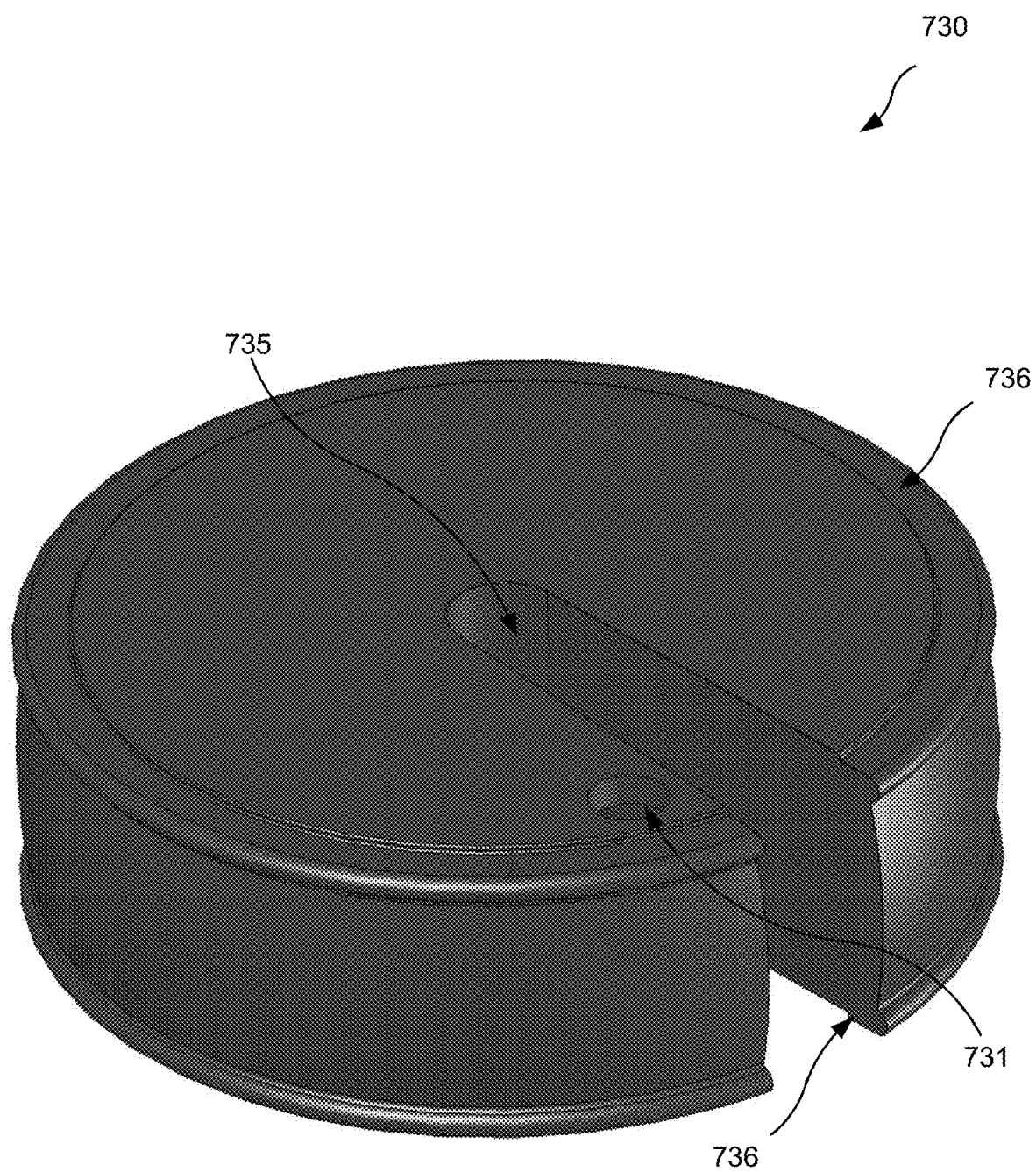
FIG. 7 illustrates a perspective view of an example reservoir 730 according to certain embodiments of the invention.

FIG. 7 illustrates a perspective view of an example reservoir 730 according to certain embodiments of the invention. In some embodiments, the reservoir 730 has a circular C-shape from the top perspective with a curved outer wall and a U-shaped center opening 735 which can be placed on top of a base (e.g., base 810 (not shown here)) and slid around a pole (e.g., pole 920 (not shown here)) from the side thereby supporting the pole in an upright position substantially perpendicular to the base. In some embodiments, the reservoir 730 has ridges 736 at the top and bottom to provide an interlocking shape for coupling to other reservoirs such that a plurality of reservoirs 730 may be stacked and interlocked against each other.

In certain embodiments, the a circular C-shaped or U-shaped tank may be inserted onto the base pole with flange from the side. In some embodiments, a doughnut shaped tank may be inserted onto the base pole with flange.

Figure 8:
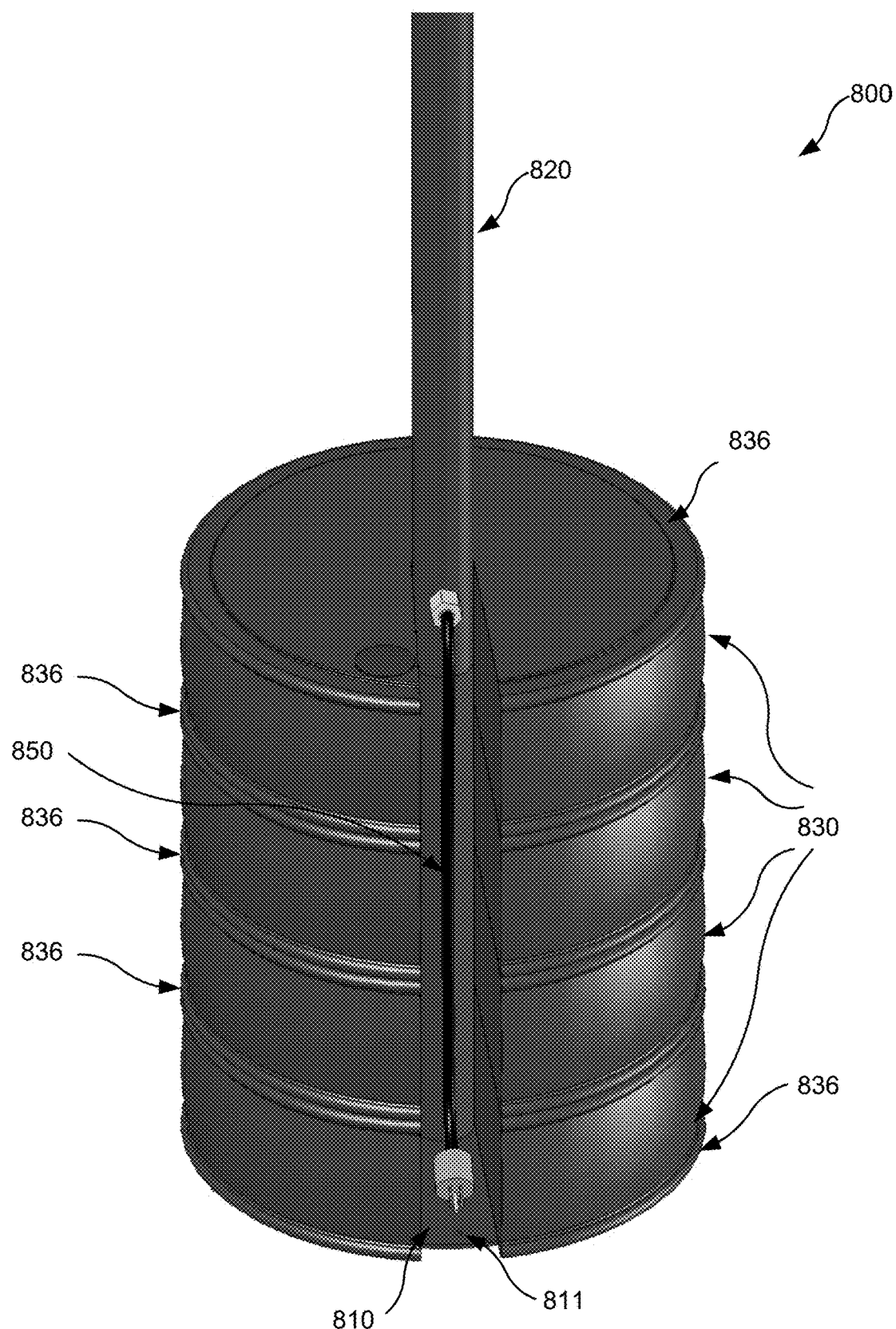
FIG. 8 illustrates a perspective view of another example upright stand 800 according to some embodiments of the present invention.

FIG. 8 illustrates a perspective view of another example upright stand 800 according to some embodiments of the present invention. In some embodiments, the pole 820 has electrical wiring 850 entering through the side of the pole 820 and extending through a portion of the pole 820. In some embodiments, a plurality of reservoirs 830 may be stacked onto the base 810. In some embodiments, the base 810 includes holes (for example hole 811). Each reservoir may be filled individually and stacked over each other in a sequential manner. Having multiple reservoirs can help stabilize the stand with more weight while making each unit more wieldy and easy to carry for an individual. This allows an individual who may not be able to or want to carry a very heavy reservoir to assemble the stand easily. The individual may simply stack each wieldable unit over each other. In some embodiment, the units may be interlocked against each other using ridges 836 in the top and bottom of each unit to provide further stability.

Figure 9:
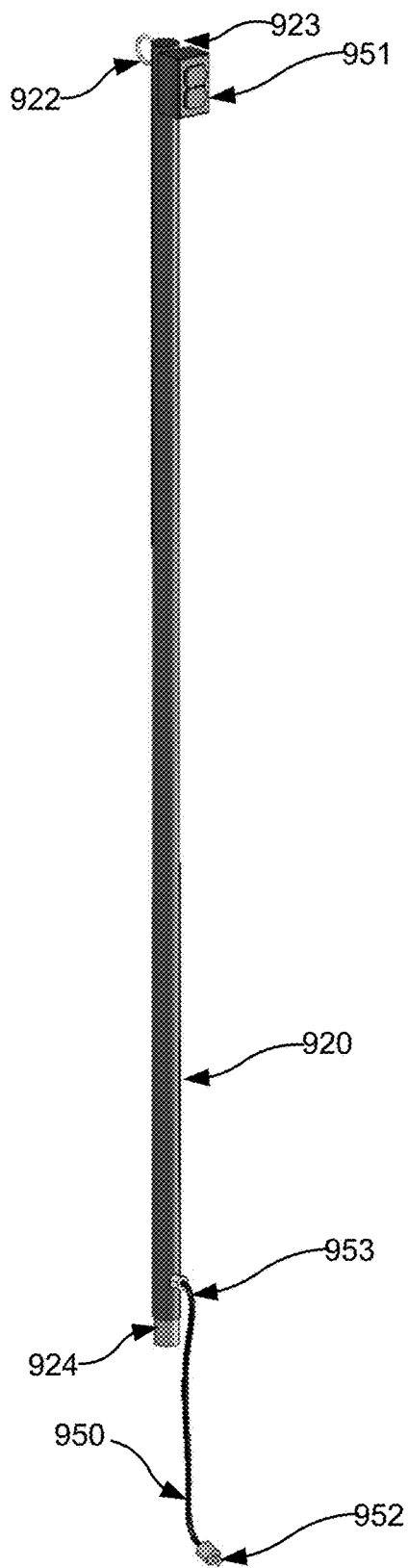
FIG. 9 illustrates a perspective view of an upright stand pole 920 with electrical wiring 950 according to some embodiments of the invention.

FIG. 9 illustrates a perspective view of an upright stand pole 920 with electrical wiring 950 according to some embodiments of the invention. In some embodiments, the pole 920 is hard wired internally with electrical wiring extending throughout the interior of the pole 920. In some embodiments, the pole 920 includes a seal 923 at the top to prevent water from entering the pole 920. The pole 920 can have exterior electrical receptacle 951 near or at the top of the pole 920 and a power in/male plug 952 on a wire tail 953 at or near the bottom of the pole 920. The receptacle 951 may be exterior of the pole 920 or set flush against or on the pole 920 such that the pole 920 functions as a water tight electrical junction box. In some embodiments, the pole 920 includes an attachment 922 (e.g., clip, ring, eyelet, hook, or quick connect carabiner) for coupling to string lighting. In some embodiments, the attachment 922 is affixed to the top or sides of the pole 920. In some embodiments, the attachment 922 supports an extension cord that is extending along the exterior of the pole 920. In some embodiments, the junctions for the electrical wiring 950 are sealed in water tight containers with water tight and rigid connections.

Figure 10:
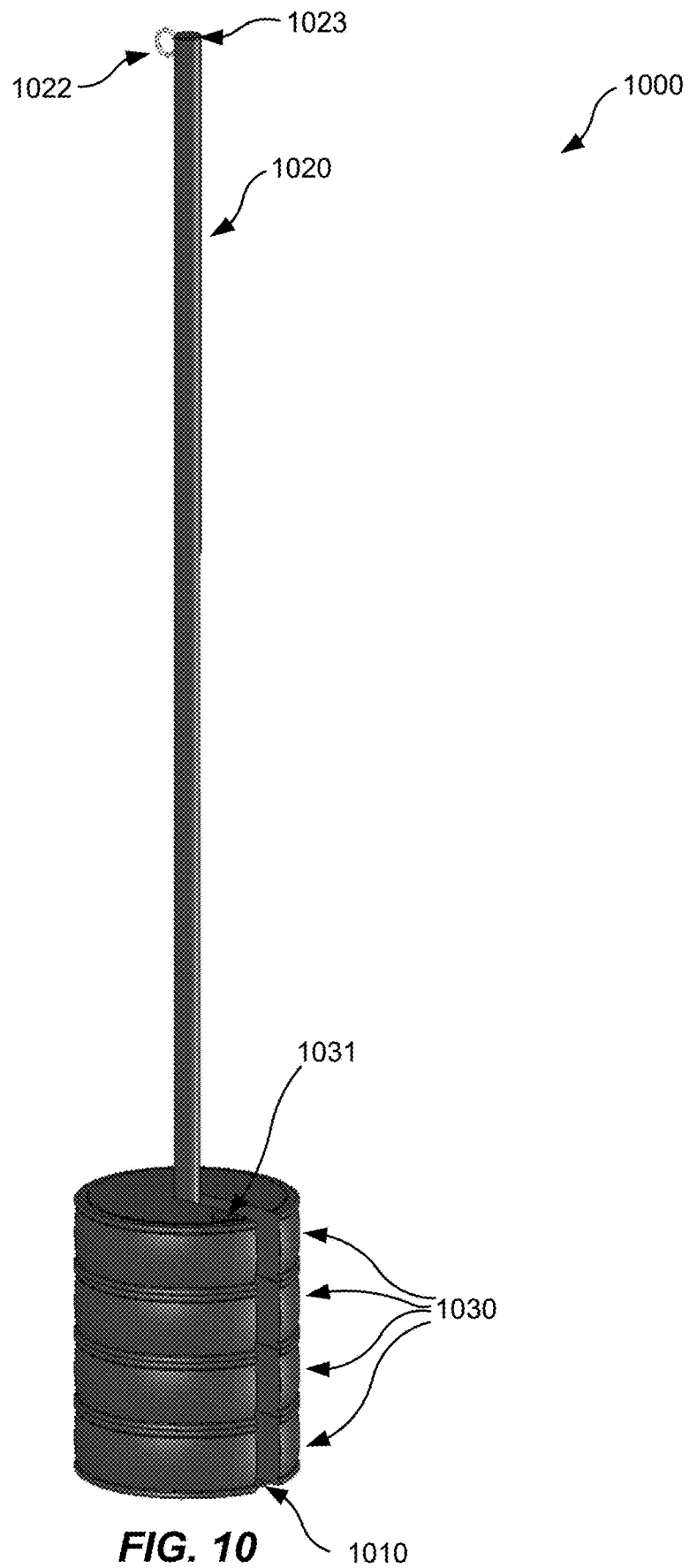
FIG. 10 illustrates a perspective view of another example upright stand 1000 according to some embodiments of the present invention.

FIG. 10 illustrates a perspective view of another example upright stand 1000 according to some embodiments of the present invention. In some embodiments, the pole 1020 includes a seal 1023 at the top to prevent water from entering the pole 1020. The pole 1020 can have an attachment 1022 (e.g., clip, ring, eyelet, hook, or quick connect carabiner) for coupling to string lighting or other displays. In some embodiments, the attachment 1022 is affixed to the top or sides of the pole 1020. In some embodiments, the attachment 1022 supports an extension cord that is extending along the exterior of the pole 1020. In some embodiments, a plurality of reservoirs 1030 may be stacked onto the base 1010. In some embodiments, each reservoir has a single opening 1031 for both filling and draining.

FIG. 11A illustrates a perspective view of another upright stand pole 1120 and base 1110 assembly with electrical wiring 1150 according to some embodiments of the present invention. In some embodiments, the pole 1120 includes a seal 1123 at the top to prevent water from entering the pole 1120 and an attachment 1122 (e.g., clip, ring, eyelet, hook, or quick connect carabiner) for coupling to string lighting or other displays. In some embodiments, the attachment 1022 is affixed to the top or sides of the pole 1020. The base 1110 may have a sleeve with a permanently affixed flange at one end. In some embodiments, the base 1110 has holes (for example 1111). In some embodiments, the pole 1120 includes a seal 1123 at the top to prevent water from entering the pole 1120. The pole 1120 can have exterior electrical receptacle 1151 near or at the top of the pole.

FIG. 11B illustrates a side view of an upright stand pole 1120 and base 1110 assembly with electrical wiring 1150 according to some embodiments of the present invention. In certain embodiments, the upright stand may be assembled by an assembly process. The assembly process may include setting the base pole, setting one or more ballast containers on a base pole or slide in from the side, filling one or more containers (or the containers may be pre-filled before they are placed onto the base pole), stacking one or more remaining pole segments (if there are multiple segments in assembling the pole), and adding electrical to the pole in the event that there is no electrical wiring running inside the pole. Different embodiments may require different variations of the assembly process.

Figure 12:
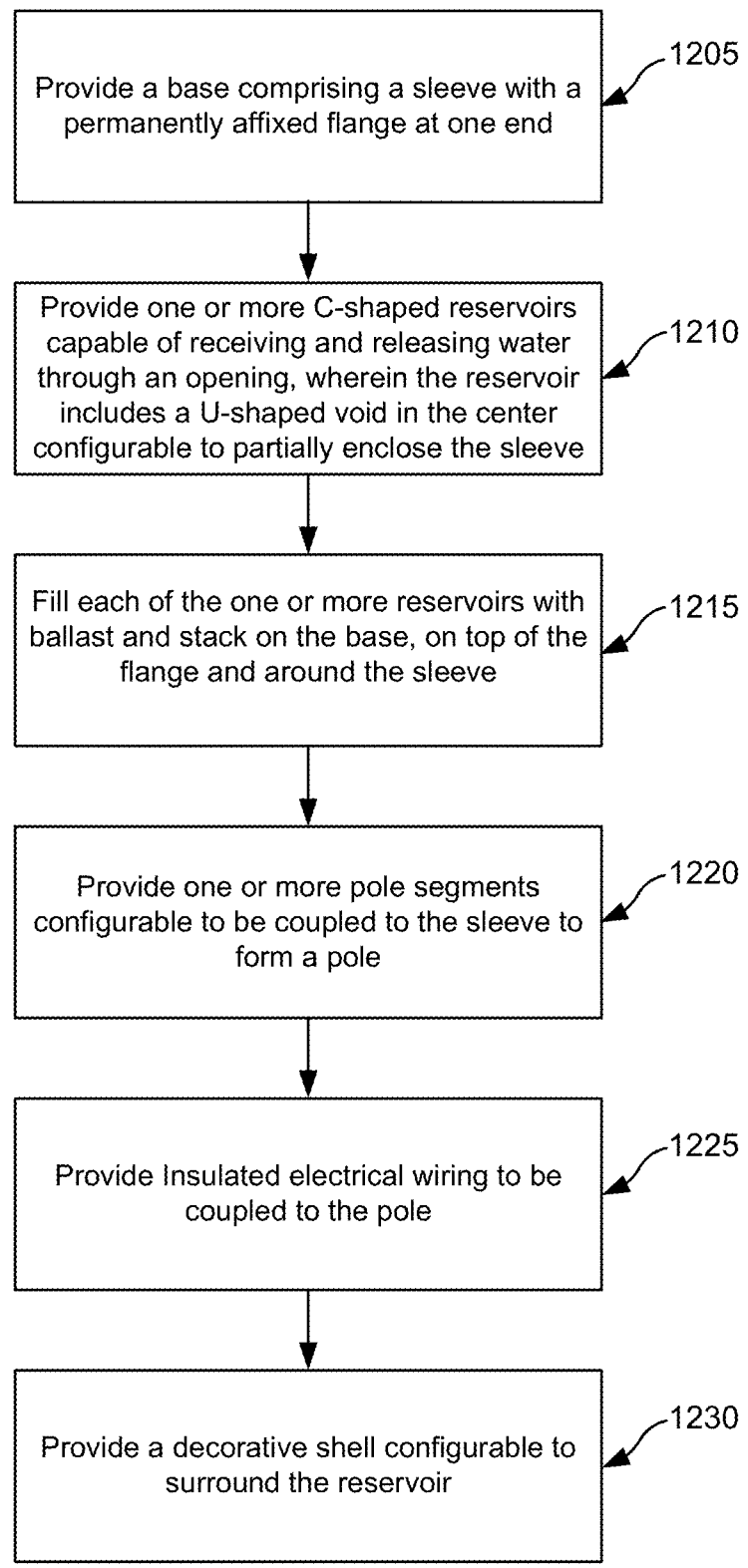
FIG. 12 illustrates an exemplary process of assembling a portable upright stand according to some embodiments of the present invention.

FIG. 12 illustrates an exemplary process 1200 of assembling an upright stand according to some embodiments of the present invention. As described in FIG. 8, an upright stand can include a base 810, a pole 820, and a reservoir 830. Not every block described in process 800 must be performed to produce an upright stand in some embodiments while other embodiments may require additional steps. As described, the assembled portable upright stand can be coupled to a series of string lights in a string lighting system. The portable upright stand can be assembled using various techniques and a combination of materials in order to provide the desired durable, weather-resistant support for the series of string lights and to fit the aesthetic of the outdoor space to be illuminated.

At block 1205, process 1200 can provide a base comprising a sleeve with a permanently affixed flange at one end. At block 1210, process 1200 can provide one or more C-shaped reservoirs capable of receiving and releasing water through an opening, wherein the reservoir includes a U-shaped void in the center configurable to partially enclose the sleeve. At block 1215, process 1200 can fill each of the one or more reservoirs with ballast and stack on the base, on top of the flange and around the sleeve. At block 1220, process 1200 can provide one or more pole segments configurable to be coupled to the sleeve to form a pole. At block 1225, process 1200 can provide insulated electrical wiring to be coupled to the pole. At block 1230, process 1200 provides a decorative shell configurable to surround the reservoir.

In the foregoing specification, aspects of the invention are described with reference to specific embodiments thereof, but those skilled in the art will recognize that the invention is not limited thereto. Various features and aspect of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventor expects skilled artisans to employ such variations as appropriate, and the inventor intends for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A portable upright stand for supporting string lighting, the portable upright stand comprising:
    a base pole with a first end and a second end;
    a middle pole with a first end and a second end, wherein the first end of the middle pole is configured to be coupled to the second end of the base pole;
    an upper pole with two ends including a first end and a second end, wherein the first end of the upper pole is configured to be coupled to the second end of the middle pole; and
    one or more stackable reservoir tanks, each stackable reservoir tank including:
        a body;
        a top face forming the top of the body;
        a bottom face forming the bottom of the body;
        wherein the body is configured to hold ballast;
        wherein the body includes an opening configured to receive ballast; and
        wherein the body has a generally cylindrical inner surface;
    wherein the base pole is configured to be inserted through the generally cylindrical inner surface of each stackable reservoir tank such that the base pole is capable of being removably, rotatably, and slidably held in an upright orientation substantially perpendicular to the bottom face of each of the one or more stackable reservoir tanks when each of the one or more stackable reservoir tanks is filled with ballast,
    wherein a combination of the base pole, middle pole and upper pole has a combined length of 7-12 feet;
    wherein a decimal ratio of the height of each stackable reservoir tank, as measured between the top face and bottom face, to the length of the combination of the base pole, middle pole, and upper pole, is greater than 0.076 and less than 0.1548; and
    wherein the second end of the upper pole comprises a seal.

2. The portable upright stand of claim 1, wherein the upper pole is coupled to one or more attachments.

3. The portable upright stand of claim 2, wherein the one or more attachments comprises an eyelet.

4. The portable upright stand of claim 3, wherein the one or more attachments further comprises a carabiner.

5. The portable upright stand of claim 2, wherein the body includes a second opening configured to drain ballast.

6. The portable upright stand of claim 2, wherein the ballast comprises water.

7. The portable upright stand of claim 6, wherein the upper pole is coupled to a second portable upright stand.

8. The portable upright stand of claim 7, wherein the portable upright stand and second portable upright stand are configured to support a decoration.

9. The portable upright stand of claim 8, wherein the decoration is string lighting.

10. The portable upright stand of claim 2, wherein a shell comprised of weather-resistant material is configured to at least partially surround the one or more stackable reservoir tanks.

* * * * *